United States Patent [19]
Williams

[11] 3,747,062
[45] July 17, 1973

[54] DIRECTION INDICATING SYSTEMS FOR ROAD VEHICLES

[75] Inventor: David Gordon Williams, Birmingham, England

[73] Assignee: Joseph Lucas (Industries) Limited, Birmingham, England

[22] Filed: Jan. 12, 1972

[21] Appl. No.: 217,176

[30] Foreign Application Priority Data
Jan. 13, 1971 Great Britain.................... 1,590/71

[52] U.S. Cl.................................. 340/81 F, 340/251
[51] Int. Cl............................................... B60q 1/38
[58] Field of Search...................... 340/79, 80, 81 R, 340/81 F, 251

[56] References Cited
UNITED STATES PATENTS

| | | |
|---|---|---|
| 3,263,119 | 7/1966 | Scholl ........................... 340/81 R X |
| 3,329,868 | 7/1967 | Domann et al............. 340/81 R UX |
| 3,593,264 | 7/1971 | Atkins............................ 340/251 X |
| 3,604,949 | 9/1971 | Conzelmann et al............ 340/80 X |
| 3,576,444 | 4/1971 | Roberts......................... 340/81 F X |
| 3,665,207 | 5/1972 | Sieber...................... 340/81 R X |

Primary Examiner—John W. Caldwell
Assistant Examiner—Kenneth N. Leimer
Attorney—John C. Holman et al.

[57] ABSTRACT

A direction indicating system for a road vehicle has a direction indicator switch operating in the usual manner, but having a resistor in series with it. Control means is provided operable by the voltage across said resistor for increasing the frequency of operation if a lamp fails.

1 Claim, 1 Drawing Figure

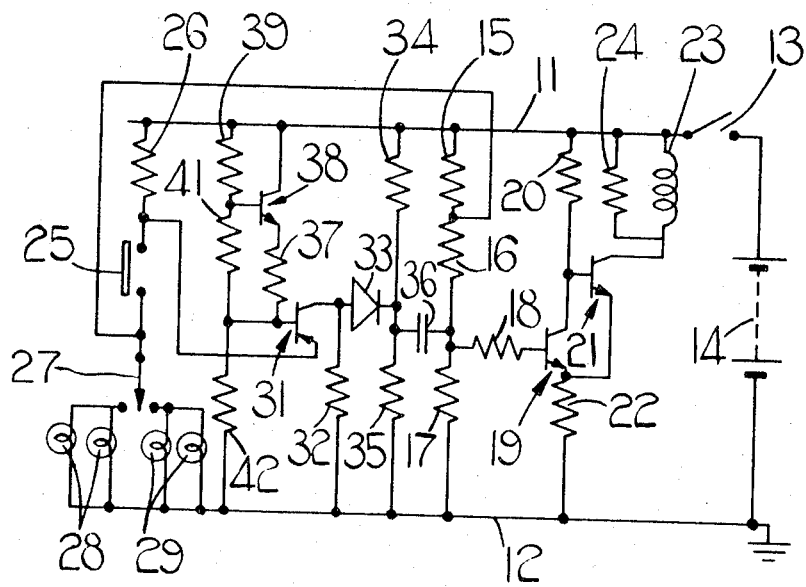

DIRECTION INDICATING SYSTEMS FOR ROAD VEHICLES

This invention relates to direction indicating systems for road vehicles.

A system according to the invention comprises in combination a direction indicator switch having a movable contact with an inoperative position and a pair of operative positions in which the direction indicator lamps on opposite sides of the vehicle respectively are energised, supply means operable when the movable contact is in an operative position to supply current intermittently at a predetermined frequency to the direction indicator lamps selected by the direction indicator switch, a resistor in series with said movable contact, and control means operable by the voltage across said resistor for increasing said predetermined frequency if a selected direction indicator lamp fails.

The accompanying drawing is a circuit diagram illustrating one example of the invention.

Referring to the drawing, there are provided positive and negative supply lines 11, 12, the line 11 being connected through the ignition switch 13 of a vehicle to the positive terminal of a vehicle battery 14, and the line 12 being connected to the negative terminal of the vehicle battery, the negative terminal being earthed.

Connected into series between the lines 11, 12 are three resistors 15, 16 and 17, the junction of the resistors 16 and 17 being connected through a resistor 18 to the base of an n-p-n transistor 19, the collector of which is connected through a resistor 20 to the line 11 and is further connected to the base of an n-p-n transistor 21, the emitters of the transistors 19 and 21 being connected to the line 12 through a resistor 22. The collector of the transistor 21 is connected to the line 11 through a coil 23 of a relay. The coil 23 being bridged by a resistor 24 and serving when energised to close a normally opened contact 25 which is connected to the line 11 through a resistor 26, and is further connected to a direction indicator switch 27. The switch 27 has a movable contact which is engageable with either of a pair of fixed contacts to energise the left-hand direction indicator lamps 28 or the right-hand direction indicator lamps 29 of the vehicle.

The junction of the resistor 26 and contact 25 is connected to the emitter of a p-n-p transistor 31, the collector of which is connected to the line 12 through a resistor 32, and is further connected through a diode 33 to the junction of a pair of resistors 34, 35 connected in series between the lines 11, 12. The junction of the resistors 34, 35 is connected through a capacitor 36 to the junction of the resistors 16, 17, and the base of the transistor 31 is connected through a resistor 37 to the emitter of an n-p-n transistor 38, the collector of which is connected to the line 11 and the base of which is connected to the line 11 through a resistor 39, and is further connected through resistors 41 and 42 in series to the line 12. The junction of the resistors 41 and 42 is connected to the base of the transistor 31, and the movable contact of switch 27 is connected to the junction of the resistors 15 and 16.

When the ignition switch 13 is closed with the switch 27 in the position shown, the transistor 19 is turned on by current flow through the resistors 15, 16 and 18 and so the transistor 21 is off and the coil 23 is de-energised. The transistor 38 and its associated resistors 37, 39, 41 maintain the base of the transistor 31 at a small but constant negative potential with respect to line 11, the characteristics of the transistor 38 serving to compensate for temperature variations, and the resistor 37 compensating for variations in the supply voltage. Since the coil 23 is de-energised, the contact 25 is open, and the emitter of the transistor 31 is connected to the line 11, so that the transistor 31 is fully conductive, and the diode 33 conducts so that the junction of the resistors 34, 35 is substantially at the potential of the line 11. The junction of the resistors 16, 17 is at a potential determined by the ratio of the combined resistance of the resistors 15 and 16 to the resistance of the resistor 17, so that the capacitor 36, although initially discharged, will rapidly charge to a potential which is a substantial part of the voltage between the lines 11, 12. However, when it is desired to indicate a turn, the switch 27 is operated to connect the junction of the resistors 15 and 16 to the line 12 through the bulbs. The capacitor 36 now charges further by way of two parallel paths, one containing the resistor 17, and the other containing the resistor 16, the switch 27 and one of the pairs of lamps 28, 29. The current flowing through the lamps at this stage is insufficient to energise them. Charging of the capacitor 36 gradually reduces the base current of the transistor 19, until a point is reached at which the transistor 19 turns off and the transistor 21 turns on, at which point the coil 23 is energised and the contact 25 closes to energise the selected pair of lamps 28 or 29. As soon as the transistor 21 conducts, the emitter potential of the transistor 19 is raised by virtue of the current flowing through the resistor 22, so ensuring that the transistor 19 is turned off rapidly.

As soon as the relay contact 25 closes to energise the selected lamps 28 or 29, the capacitor 36 can discharge through the resistor 16, the contact 25 and the resistor 26, and when the capacitor 36 has discharged to a predetermined level, the transistor 19 will turn on again, turning off the transistor 21, so that the contact 25 opens and the lamps are de-energised. When the contact 25 opens, the potential at the junction of the resistors 34 and 35 will return to approximately the potential of the line 11. The cycle is then repeated, assuming that the switch 27 is still operated, and the lamps 28 or 29 flash at a rate which is determined by the length of time taken for the capacitor 36 to discharge sufficiently to enable the transistor 19 to turn on again. The arrangement is such that provided both lamps 28 or 29 are operating satisfactorily, then the current flowing through the resistor 26 reaches a level such that the emitter potential of the transistor 31 is reduced to such a value that the transistor 31 ceases to conduct. When the transistor 31 is turned off in this way, the diode 33 will not be conductive, and the potential at the junction of the resistors 34 and 35 will be reduced to a value which is considerably less than the potential of the line 11. The conduction of the transistor 19 is determined by the potential at the junction of the resistors 16 and 17, which in turn is determined both by the charge on the capacitor 36 and by the state of conduction of the transistor 31. The capacitor 36 must discharge to a predetermined level before the transistor 19 turns on again and it will be seen that the amount by which the capacitor 36 must discharge is equal to the increased voltage drop across the resistor 22 when the transistor 21 conducts, plus the reduction in voltage at the junction of the resistors 34, 35 occasioned by the turning off of the transistor 31. The period of time taken for the capacitor 36 to discharge determines the operating frequency of the system, but in the event that one of the lamps 28 or 29 fails, then when the contact 25 is closed, the current flowing through the resistor 26 is insufficient to turn off the transistor 31, so that the diode 33 is still conductive, and the junction of the resistors 34 and 35 remains at a potential close to the potential of the line 11. In these circumstances, the capacitor 36 only has to discharge by a voltage equal to the increase voltage drop against the resistor 22, and consequently the transistor 19 turns on again far more quickly than in the case when both lamps 28 or 29 are operating satisfactorily. Thus, the frequency of operation of the system increases substantially giving a warning to the driver.

A further switch can be provided for operating all the lamps 28 and 29 simultaneously to give a hazard warning and it will be seen that since the transistor 31 will be off if all four lamps are operating, then the frequency of operation is substantially unaffected by the simultaneous flashing of all four lamps.

I claim:

1. A direction indicating system for a road vehicle, comprising in combination first and second supply lines for connection to a vehicle battery, a first resistance chain connected across said supply lines, a second resistance chain connected across said supply lines, a capacitor coupling a point in the first resistance chain to a point in the second resistance chain, a switching circuit connected to a point in said second resistance chain, said switching circuit having a first state and a second state and being driven from the first state to the second state when the voltage across said capacitor reaches a predetermined level, and being driven back from the second state to the first state when the voltage across said capacitor falls to a second predetermined level, the switching circuit when in said second state serving to energise a relay coil, a direction indicator switch having a movable contact with an inoperative position and a pair of operative positions in which it completes a circuit across the supply lines to the direction indicator lamps on opposite sides of the vehicle respectively, the circuit completed by the movable contact of the direction indicator switch including a normally open contact of said relay and a resistor, a transistor having its base and emitter coupled to the supply lines and said resistor so that said transistor is normally conductive but turns off if said movable contact is in an operative position unless one of the selected direction indicator lamps fails, means coupling said transistor to the first resistance chain to change the potential at one side of said capacitor when the transistor conducts, and a connection from the movable contact of the direction indicator switch to the second resistance chain, the arrangement being such that with the movable contact in an operative position and said transistor turning off, the capacitor charges and discharges to cause the lamps to flash at a predetermined frequency, but if a lamp fails the transistor remains conductive and acts on said first resistance chain to modify the amount by which the capacitor must discharge before the switching circuit de-energises the relay coil, so increasing the operating frequency of the system.

* * * * *